United States Patent
Charron et al.

(10) Patent No.: US 9,097,209 B2
(45) Date of Patent: Aug. 4, 2015

(54) GAS TURBINE ENGINE THRUST REVERSER SYSTEM

(75) Inventors: Michael N. Charron, Baltic, CT (US); James L. Lucas, Hamden, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 599 days.

(21) Appl. No.: 13/431,356

(22) Filed: Mar. 27, 2012

(65) Prior Publication Data

US 2013/0255225 A1  Oct. 3, 2013

(51) Int. Cl.
  *F02K 3/02* (2006.01)
  *F02K 1/72* (2006.01)

(52) U.S. Cl.
  CPC . *F02K 1/72* (2013.01); *Y02T 50/671* (2013.01)

(58) Field of Classification Search
  CPC ............. F02K 1/76; F02K 1/70; F02K 1/763; F02K 1/766; F02K 1/09; F02K 1/72; F02K 3/06; F02K 3/075
  USPC .................. 60/226.1, 226.2, 226.3, 796–800; 239/265.29; 244/110 B
  See application file for complete search history.

(56) References Cited

U.S. PATENT DOCUMENTS

| | | | |
|---|---|---|---|
| 5,239,822 A * | 8/1993 | Buchacher | 60/226.2 |
| 5,725,182 A | 3/1998 | Valleroy | |
| 6,050,522 A | 4/2000 | Brossier et al. | |
| 6,637,186 B1 * | 10/2003 | Van Duyn | 60/223 |
| 7,735,778 B2 | 6/2010 | Lair et al. | |
| 8,127,531 B2 | 3/2012 | Parham | |
| 8,201,390 B2 * | 6/2012 | Sternberger | 60/226.2 |
| 2009/0071122 A1 | 3/2009 | Maguire et al. | |
| 2010/0126139 A1 * | 5/2010 | Howe | 60/226.2 |
| 2010/0229528 A1 | 9/2010 | Ramlaoui et al. | |
| 2010/0269511 A1 | 10/2010 | Vauchel | |
| 2011/0072780 A1 | 3/2011 | Somerfield et al. | |
| 2011/0167790 A1 * | 7/2011 | Cloft et al. | 60/226.2 |

FOREIGN PATENT DOCUMENTS

| | | |
|---|---|---|
| EP | 2 060 765 A2 | 5/2009 |
| EP | 2 060 767 A2 | 5/2009 |
| EP | 2 060 770 A2 | 5/2009 |
| EP | 2 354 516 A2 | 1/2011 |
| EP | 2 311 731 A1 | 4/2011 |

OTHER PUBLICATIONS

International Search Report and Written Opinion for International Application No. PCT/US2013/033172 completed on Jan. 7, 2014.

(Continued)

*Primary Examiner* — Craig Kim (74) *Attorney, Agent, or Firm* — Carlson, Gaskey & Olds, P.C.

(57) ABSTRACT

A gas turbine engine thrust reverser system includes a fan nacelle having a fixed portion and a movable portion configured to move relative to the fixed portion between opened and closed positions in response to a command to selectively provide an opening between the fixed and movable portions. A fan case is arranged within the fan nacelle. The fan case includes an integral bull nose adjacent to the opening in the open position and to the movable portion in the closed position. The bull nose has a curved wall sloping radially outward.

20 Claims, 5 Drawing Sheets

(56) References Cited

OTHER PUBLICATIONS

International Preliminary Report on Patentability for PCT Application No. PCT/US2013/033172, mailed Oct. 9, 2014.

Singapore Search Report for Application No. 11201404965W dated Apr. 21, 2015.

* cited by examiner

GAS TURBINE ENGINE THRUST REVERSER SYSTEM

BACKGROUND

This disclosure relates to a gas turbine engine thrust reverser system. In particular, the disclosure relates to a fan case and bull nose arrangement.

One type of gas turbine engine thrust reverser system includes a fan nacelle having a moveable portion that translates relative to the fixed portion. The thrust reverser system includes a thrust reverser mechanism having an actuator that translates the moveable portion between closed and opened positions. Bypass flow travels through the engine between the fan nacelle and a core nacelle. An opening is provided in the fan nacelle between the fixed portion and the moveable portion when in the open position. Redirected bypass flow is expelled through the opening during thrust reversing.

A bull nose is provided at a forward area of the opening to provide a smooth transition from the bypass flowpath to the opening. Typically, the bull nose is a multi-pieced box-like sheet metal structure secured to the thrust reverser. The fabricated bull nose and associated attachment features take up significant space in the fan nacelle.

SUMMARY

In one exemplary embodiment, a gas turbine engine thrust reverser system includes a fan nacelle having a fixed portion and a movable portion configured to move relative to the fixed portion between opened and closed positions in response to a command to selectively provide an opening between the fixed and movable portions. A fan case is arranged within the fan nacelle. The fan case includes an integral bull nose adjacent to the opening in the open position and to the movable portion in the closed position. The bull nose has a curved wall sloping radially outward.

In a further embodiment of any of the above, a thrust reverser mechanism includes an actuator operatively connected to the movable portion. A controller is in communication with the actuator and is configured to provide the command.

In a further embodiment of any of the above, the thrust reverser mechanism includes a cascade array that is arranged in a cavity of the movable portion in the closed position and is arranged in the opening in the open condition.

In a further embodiment of any of the above, the gas turbine engine thrust reverser system includes a core nacelle. A bypass flow path is arranged between the core and fan nacelles and is configured to receive a bypass flow. The bypass flow is redirected through the cascade array with the movable portion in the open position.

In a further embodiment of any of the above, the thrust reverser mechanism includes blocker doors that are supported by the movable portion. The blocker doors are configured to move between stowed and deployed positions in response to the command. The blocker doors obstruct the bypass flow path in the deployed position with the movable portion in the open position.

In a further embodiment of any of the above, the fan case and bull nose are constructed from a forged metal alloy.

In a further embodiment of any of the above, the movable portion includes a seal support to which a seal is mounted. The seal engages the bull nose with the movable portion in the closed position.

In a further embodiment of any of the above, the gas turbine engine thrust reverser system includes a thrust reverser mechanism that includes blocker doors supported by the movable portion. The blocker doors are configured to move between stowed and deployed positions in response to the command. The blocker doors engage the seal and obstruct the bypass flow path in the deployed position with the movable portion in the open position.

In a further embodiment of any of the above, the fixed portion includes outer and inner nacelle walls. The inner nacelle wall includes a shell that is arranged between the curved wall and the seal.

In a further embodiment of any of the above, the fixed portion includes outer and inner nacelle walls. The bull nose has an annular recess that receives a seal and a support flange is secured to the outer nacelle wall and engages the seal.

In a further embodiment of any of the above, gas turbine engine thrust reverser system includes a thrust reverser mechanism that includes a cascade array that is arranged in a cavity of the movable portion in the closed position and is arranged in the opening in the open condition. The cascade array is mounted to the support flange.

In a further embodiment of any of the above, struts are integral with the fan case and are configured to be arranged aft of a fan section disposed within the fan case.

In a further embodiment of any of the above, the struts extend from the bull nose.

In a further embodiment of any of the above, circumferentially spaced flow exit guide vanes are arranged axially between the fan section and the struts. The flow exit guide vanes are secured to the fan case by fasteners.

In a further embodiment of any of the above, a mount is provided on the fan case near the flow exit guide vanes and is configured to secure to a pylon.

In one exemplary embodiment, a gas turbine engine includes a fan nacelle having a fixed portion and a movable portion is configured to move relative to the fixed portion between opened and closed positions in response to a command to selectively provide an opening between the fixed and movable portions. The gas turbine engine includes a fan section. A fan case is arranged within the fan nacelle and surrounds the fan section. The fan case includes an integral bull nose adjacent to the opening in the open position and to the movable portion in the closed position. The bull nose has a curved wall sloping radially outward.

In a further embodiment of any of the above, a core is supported by the fan case by struts. Low and high spools are arranged in the core. Low pressure compressor and turbine sections are mounted on the low spool and high pressure compressor and turbine sections are mounted on the high spools.

In a further embodiment of any of the above, a geared architecture interconnects the low spool to the fan section.

In a further embodiment of any of the above, the struts are integral with the fan case and circumferentially arranged flow exit guide vanes are secured to the fan case between the struts and the fan section and extend radially inward to the core.

In a further embodiment of any of the above, gas turbine engine includes a core nacelle. A bypass flow path is arranged between the core and fan nacelles and is configured to receive a bypass flow. A thrust reverser mechanism includes a cascade array arranged in a cavity of the movable portion in the closed position and arranged in the opening in the open condition. The bypass flow is redirected through the cascade array with the movable portion in the open position.

BRIEF DESCRIPTION OF THE DRAWINGS

The disclosure can be further understood by reference to the following detailed description when considered in connection with the accompanying drawings wherein.

DETAILED DESCRIPTION

Figure 1:
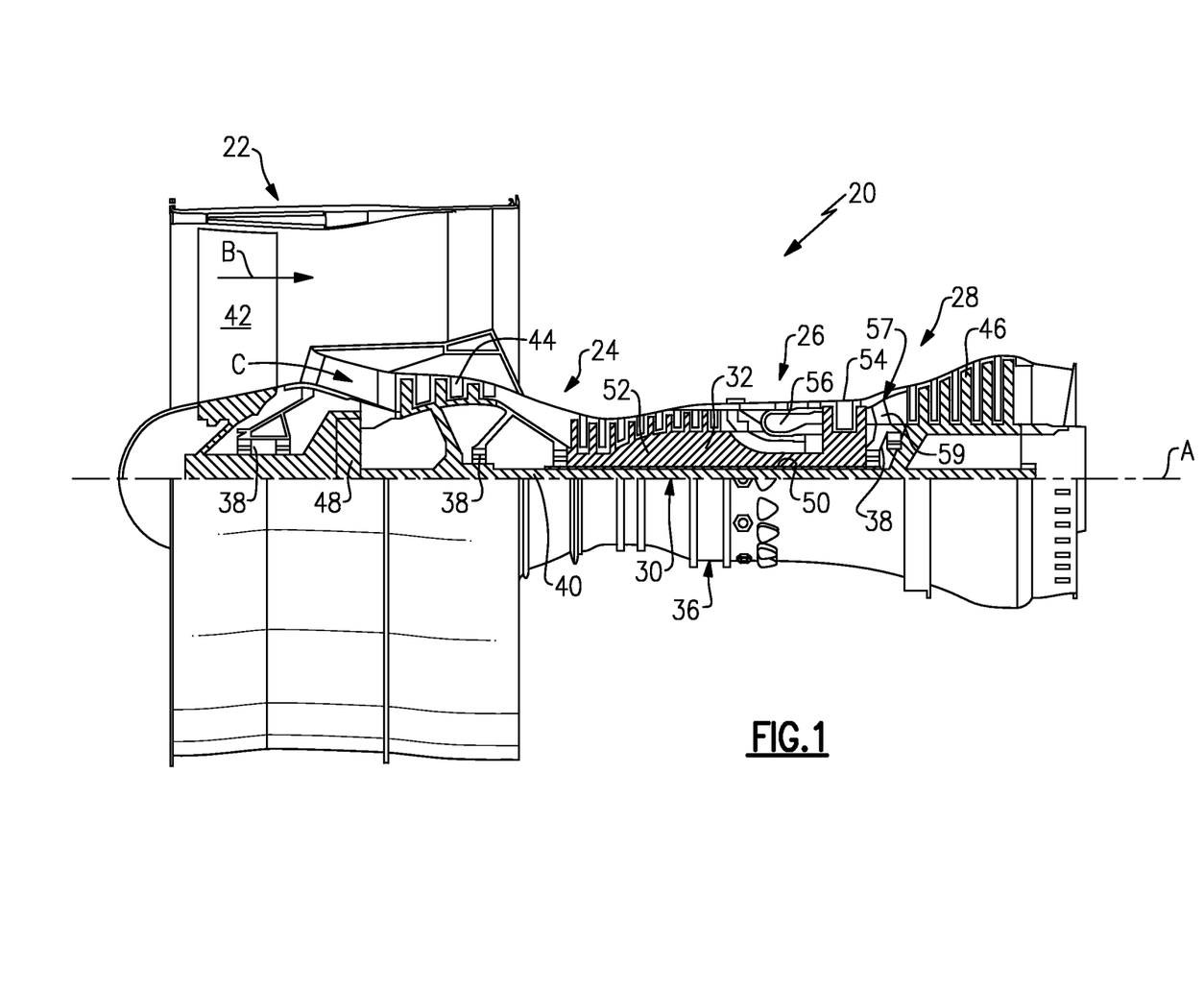
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned per hour divided by lbf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tambient\ deg\ R)/518.7)^{0.5}]$. The "Low corrected fan tip speed" as disclosed herein according to one non-limiting embodiment is less than about 1150 ft/second.

Figure 2:
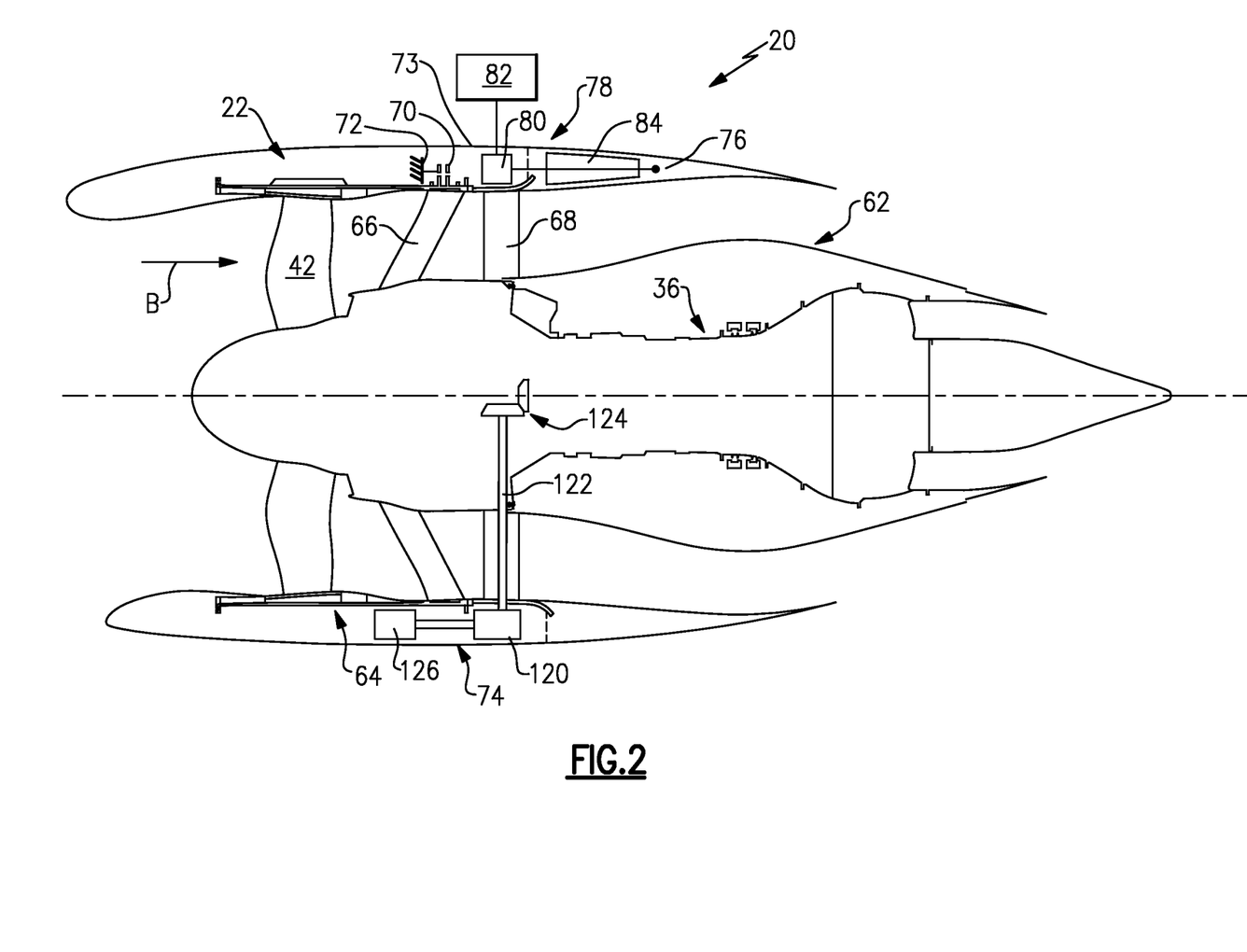
FIG. 2 schematically illustrates example fan and core nacelles and a thrust reverser system.

The static structure 36 is arranged within a core nacelle 62. The bypass flowpath B is provided between the core nacelle 62 and a fan nacelle 74. A fan case 64 includes a mount 70 for supporting the engine 20 relative to a pylon 72 provided by the airframe. Flow exit guide vanes 66 are circumferentially arranged about the static structure 36 and extend radially inwardly from the fan case 64. Struts 68 are provided rearward of the flow exit guide vanes 66 and extend between the fan case 64 and the static structure 36. In one example, there may be around four struts 68, which accommodate various engine components.

The fan nacelle 74 includes a fixed portion 75 and a moveable portion 76, which is configured to translate relative to the fixed portion 75 in one example. A thrust reverser system 78 includes an actuator 80 operatively connected to the moveable portion 76. A controller 82 communicates a command to the actuator 80 to selectively move the moveable portion 76 between closed and opened positions, respectively illustrated in FIGS. 3 and 4.

Figure 3:
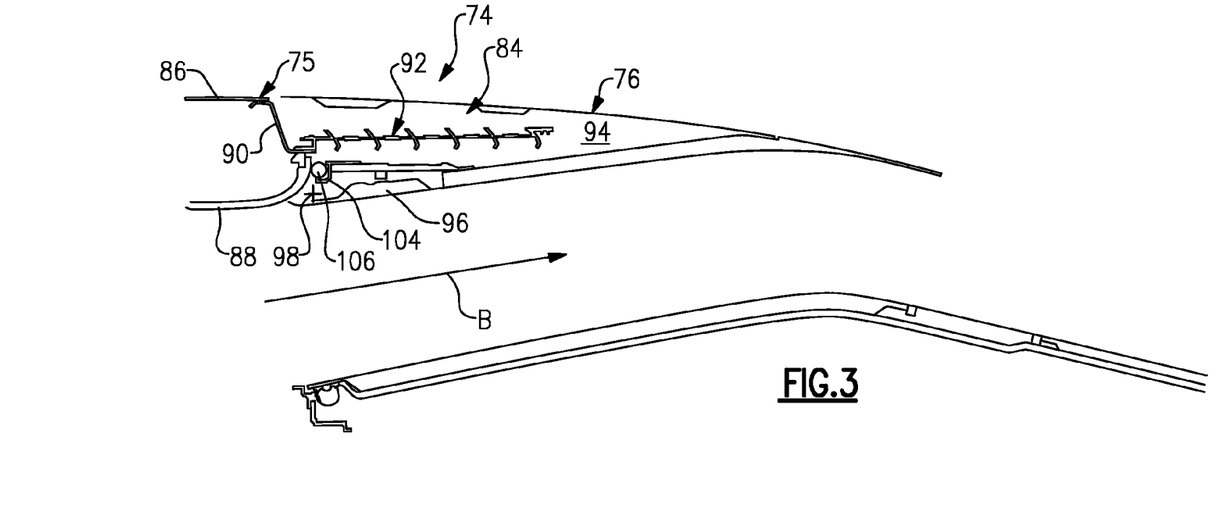
FIG. 3 illustrates a movable portion of the fan nacelle in a closed position and blocker doors stowed.
Figure 4:
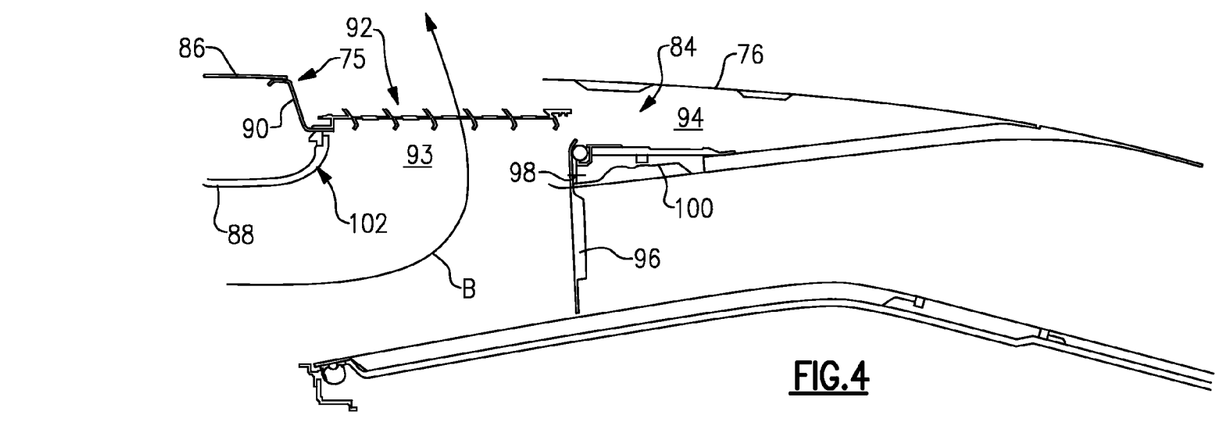
FIG. 4 illustrates the movable portion in an open position with the blocker doors deployed.

Referring to FIGS. 3 and 4, the fixed portion 75 includes outer and inner nacelle walls 86, 88. The thrust reverser system 78 includes a thrust reverser mechanism 84 having a cascade array 92 mounted to a support flange 90. The annular support flange 90 is secured to the outer nacelle wall 86. The moveable portion 76 provides an annular cavity 94 that receives the cascade array 92 in the closed position. An opening 93 is provided between the fixed and moveable portions 75, 76, exposing the cascade array 92, as shown in FIG. 4.

Blocker doors 96 are supported on the moveable portion 76 and rotate about a pivot 98 from a stowed position, shown in FIG. 3, to a deployed position, shown in FIG. 4. The blocker doors 96 are received in corresponding recesses 100 provided in the moveable portion 76 in the stowed and closed positions.

The blocker doors 96 obstruct the bypass flow B with the blocker doors 96 deployed and the movable portion 76 in the open position. In this configuration, the bypass flow B is forced through the opening 93 and cascade array 92 thereby significantly diminishing thrust.

Figure 5:
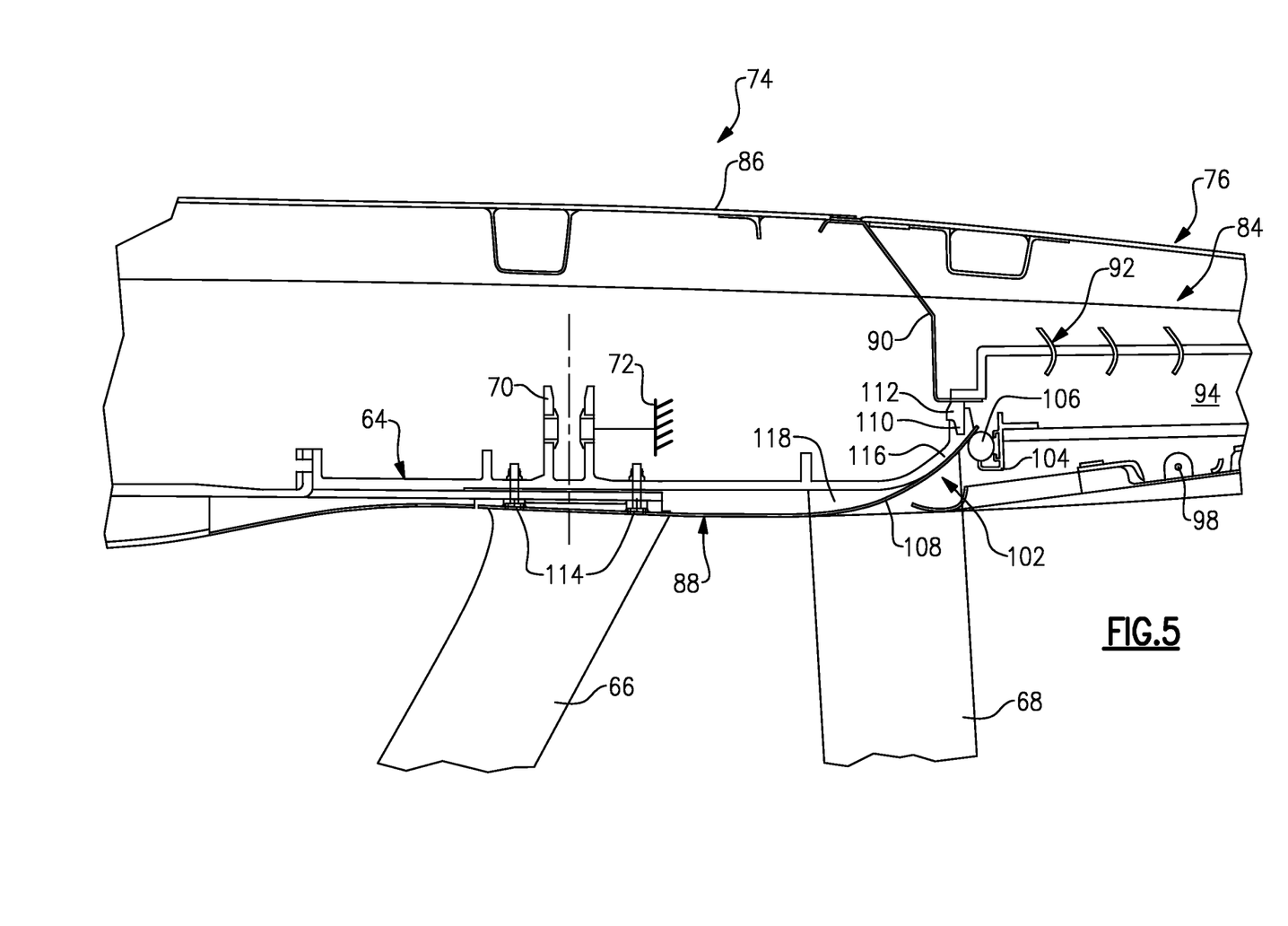
FIG. 5 is an enlarged view of the fan nacelle depicting an example fan case and bull nose arrangement.

Referring to FIGS. 3-5, a bull nose 102 including a curved wall 116 is provided at the rear of the fan case 64. The bull nose 102 is integral with the fan case 64, which may be constructed from a forged metallic alloy. In this manner, a more compact, light-weight bull nose may be provided thus eliminating the prior box-like bull nose structure, which enables other components, such as a gear box 120 to be located near the thrust reverser system 78, as shown in FIG. 1. In one example, a shaft 122 extends through a strut 68 and receives rotational input from a bevel gear set 124, which may be rotationally driven by one of the spools. A gearbox 120 is arranged in the fan nacelle 74 and receives rotational input from the shaft 122 to rotationally drive components 126, such as a hydraulic pump or generator.

Returning to FIG. 5, the moveable portion 76 includes a seal support 104 on which a first seal 106 is mounted. The first seal 106 engages the bull nose 102 in the closed position and the blocker door 96 in the open and deployed positions. In the example, the inner nacelle wall 88 includes a curved annular shell 108. The shell 108 is provided between the curved wall 116 and the first seal 106. The curved wall 116 includes an annular recess 110 that receives a second seal 112 that engages the support flange 90.

The outer ends 118 of the strut 68 may be integrally formed with the fan case 64. In one example, the end 118 is arranged radially beneath the curved wall 116 to provide a more axially compact arrangement. The flow exit guide vanes 66, which are arranged axially between the fan 42 and the struts 68, are secured to the fan case 64 by fasteners 114.

Figure 6:
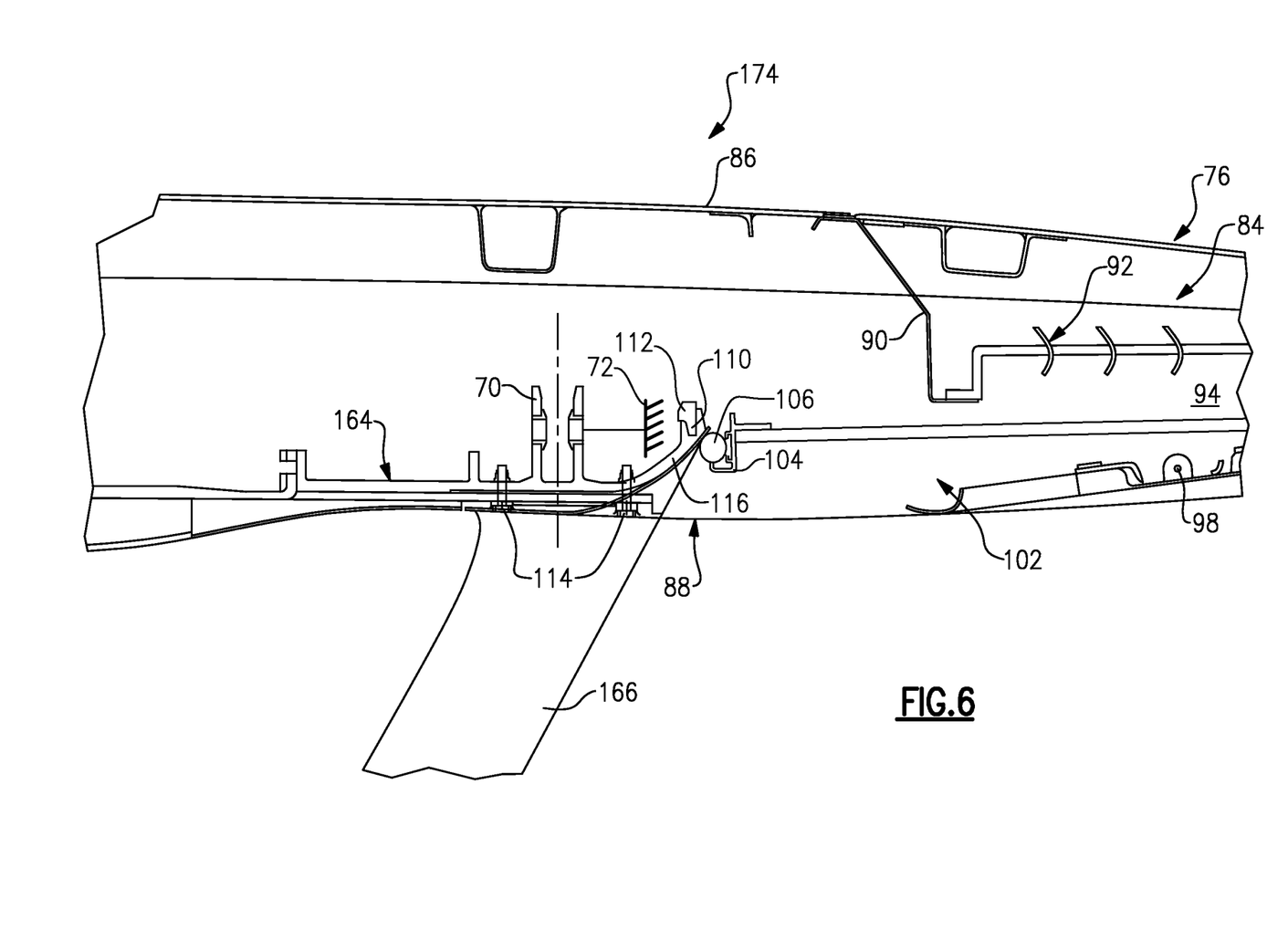
FIG. 6 is an enlarged view of another fan nacelle without struts in near the bull nose arrangement.

A fan nacelle 174 may be configured for engine applications without struts, as shown in FIG. 6. In this example arrangement, the flow exit guide vanes 166 extend to the bull nose 216, which is integral with the fan case 164. Some flow exit guide vanes are structural struts and other are non-structural. It should be understood that the bull nose may be located in other desirable axial positions.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine thrust reverser system comprising:
a fan nacelle having a fixed portion and a movable portion configured to move relative to the fixed portion between opened and closed positions in response to a command to selectively provide an opening between the fixed and movable portions;
a fan case arranged within the fan nacelle, the fan case including a wall that has an integral bull nose, the fan case adjacent to the opening in the open position and to the movable portion in the closed position, the bull nose provided by a curved portion at a terminal end of the wall, the curved portion sloping radially outward;
a core supported by the fan case by struts; and
circumferentially spaced flow exit guide vanes mounted to the wall, wherein the flow exit guide vanes are secured to the fan case between the struts and the fan section and extend radially inward to the core.

2. The gas turbine engine thrust reverser system according to claim 1, comprising a thrust reverser mechanism including an actuator operatively connected to the movable portion, and a controller is in communication with the actuator and is configured to provide the command.

3. The gas turbine engine thrust reverser system according to claim 2, wherein the thrust reverser mechanism includes a cascade array arranged in a cavity of the movable portion in the closed position and arranged in the opening in the open condition.

4. The gas turbine engine thrust reverser system according to claim 3, comprising a core nacelle, and a bypass flow path arranged between the core and fan nacelles and configured to receive a bypass flow, the bypass flow redirected through the cascade array with the movable portion in the open position, the flow exit guide vanes arranged in the bypass flow path.

5. The gas turbine engine thrust reverser system according to claim 4, wherein the thrust reverser mechanism includes blocker doors supported by the movable portion, the blocker doors are configured to move between stowed and deployed positions in response to the command, the blocker doors obstruct the bypass flow path in the deployed position with the movable portion in the open position.

6. The gas turbine engine thrust reverser system according to claim 1, wherein the fan case and bull nose are constructed from a forged metal alloy.

7. The gas turbine engine thrust reverser system according to claim 1, wherein the movable portion includes a seal support to which a seal is mounted, the seal engages the bull nose with the movable portion in the closed position.

8. The gas turbine engine thrust reverser system according to claim 7, comprising a thrust reverser mechanism that includes blocker doors supported by the movable portion, the blocker doors are configured to move between stowed and deployed positions in response to the command, the blocker doors engage the seal and obstruct the bypass flow path in the deployed position with the movable portion in the open position.

9. The gas turbine engine thrust reverser system according to claim 7, wherein the fixed portion includes outer and inner nacelle walls, the inner nacelle wall includes a shell arranged between the curved wall and the seal.

10. The gas turbine engine thrust reverser system according to claim 1, wherein the fixed portion includes outer and inner nacelle walls, the curved wall terminates in an edge that has an annular recess receiving a seal, and a support flange is secured to the outer nacelle wall and engages the seal.

11. The gas turbine engine thrust reverser system according to claim 10, comprising a thrust reverser mechanism that includes a cascade array arranged in a cavity of the movable portion in the closed position and arranged in the opening in the open condition, the cascade array mounted to the support flange.

12. The gas turbine engine thrust reverser system according to claim 1, comprising struts integral with the fan case and configured to be arranged aft of a fan section disposed within the fan case.

13. The gas turbine engine thrust reverser system according to claim 12, wherein the struts extend from the bull nose.

14. The gas turbine engine thrust reverser system according to claim 13, wherein the flow exit guide vanes are arranged axially between the fan section and the struts, the flow exit guide vanes secured to the fan case by fasteners.

15. The gas turbine engine thrust reverser system according to claim 14, comprising a mount provided on the fan case near the flow exit guide vanes and configured to secure to a pylon.

16. A gas turbine engine comprising:
a fan nacelle having a fixed portion and a movable portion configured to move relative to the fixed portion between opened and closed positions in response to a command to selectively provide an opening between the fixed and movable portions;

a fan section;

a fan case arranged within the fan nacelle and surrounding the fan section, the fan case including a wall that has an integral bull nose, the fan case adjacent to the opening in the open position and to the movable portion in the closed position, the bull nose provided by a curved portion at a terminal end of the wall, the curved portion sloping radially outward;

a core supported by the fan case by struts; and circumferentially spaced flow exit guide vanes mounted to the wall, wherein the flow exit guide vanes are secured to the fan case between the struts and the fan section and extend radially inward to the core.

17. The gas turbine engine according to claim 16, comprising low and high spools arranged in the core, low pressure compressor and turbine sections mounted on the low spool, and high pressure compressor and turbine sections mounted on the high spools.

18. The gas turbine engine according to claim 17, comprising a geared architecture interconnecting the low spool to the fan section.

19. The gas turbine engine according to claim 17, wherein the struts are integral with the fan case.

20. The gas turbine engine according to claim 16, comprising a core nacelle, a bypass flow path arranged between the core and fan nacelles and configured to receive a bypass flow, and a thrust reverser mechanism includes a cascade array arranged in a cavity of the movable portion in the closed position and arranged in the opening in the open condition, the bypass flow redirected through the cascade array with the movable portion in the open position.

* * * * *